US011040486B2

(12) United States Patent
Kimblad et al.

(10) Patent No.: US 11,040,486 B2
(45) Date of Patent: Jun. 22, 2021

(54) MANUFACTURING METHOD AND MANUFACTURING APPARATUS

(71) Applicant: Digital Metal AB, Höganäs (SE)

(72) Inventors: Hans Kimblad, Höganäs (SE); Niclas Malm, Höganäs (SE)

(73) Assignee: DIGITAL METAL AB, Höganäs (SE)

(*) Notice: Subject to any disclaimer, the term of this patent is extended or adjusted under 35 U.S.C. 154(b) by 263 days.

(21) Appl. No.: 16/083,852

(22) PCT Filed: Mar. 8, 2017

(86) PCT No.: PCT/EP2017/055425
§ 371 (c)(1),
(2) Date: Sep. 10, 2018

(87) PCT Pub. No.: WO2017/153463
PCT Pub. Date: Sep. 14, 2017

(65) Prior Publication Data
US 2019/0061237 A1 Feb. 28, 2019

(30) Foreign Application Priority Data

Mar. 9, 2016 (GB) .................... 1604112

(51) Int. Cl.
*B29C 64/165* (2017.01)
*B22F 5/10* (2006.01)
(Continued)

(52) U.S. Cl.
CPC .......... *B29C 64/165* (2017.08); *B22F 1/0074* (2013.01); *B22F 5/10* (2013.01);
(Continued)

(58) Field of Classification Search
None
See application file for complete search history.

(56) References Cited

U.S. PATENT DOCUMENTS 6,363,606 B1   4/2002   Johnson, Jr. et al.
6,861,613 B1   3/2005   Meiners et al.
(Continued)

FOREIGN PATENT DOCUMENTS

EP    2156942 A1    2/2010
JP    2003505250 A  2/2003
(Continued)

OTHER PUBLICATIONS

International Search Report and Written Opinion; dated Jun. 14, 2017; 10 pages.
(Continued)

*Primary Examiner* — Matthew J Daniels
*Assistant Examiner* — Paul Spiel
(74) *Attorney, Agent, or Firm* — Lowe Graham Jones PLLC

(57) ABSTRACT

According to a first aspect of the present disclosure, there is provided an additive manufacturing method. In the method, regions of successively-deposited layers of granular construction material are bound together so as to form a three-dimensional structure of bound material extending through and between the layers. The method comprises depositing a first granular construction material as a layer into a build region. The method comprises selectively binding regions of the first granular construction material together to form bound regions within the layer. The method comprises removing unbound granular construction material from the layer so as to provide at least one void in the layer. The method comprises depositing a second granular construction material into the build region so as to fill the at least one void. The method comprises selectively binding regions of the second granular construction material together to form bound regions within the layer. In the method, the second granular construction material is different from the first (Continued)

granular construction material. The method is repeated to form the object. An apparatus suitable for implementing the method is also disclosed.

19 Claims, 3 Drawing Sheets

(51) Int. Cl.
  *B33Y 10/00* (2015.01)
  *B33Y 30/00* (2015.01)
  *B29C 64/153* (2017.01)
  *B29C 64/205* (2017.01)
  *B22F 12/00* (2021.01)
  *B22F 10/10* (2021.01)
  *B33Y 50/02* (2015.01)
  *B22F 7/06* (2006.01)
  *B29C 64/209* (2017.01)
  *B29C 64/393* (2017.01)
  *B22F 1/00* (2006.01)

(52) U.S. Cl.
  CPC ............ *B22F 7/06* (2013.01); *B22F 12/00* (2021.01); *B29C 64/153* (2017.08); *B29C 64/205* (2017.08); *B29C 64/209* (2017.08); *B29C 64/393* (2017.08); *B33Y 10/00* (2014.12); *B33Y 30/00* (2014.12); *B22F 10/10* (2021.01); *B22F 2998/10* (2013.01); *B33Y 50/02* (2014.12); *Y02P 10/25* (2015.11)

(56) References Cited

U.S. PATENT DOCUMENTS

| | | | |
|---|---|---|---|
| 2005/0074596 A1* | 4/2005 | Nielsen | B29C 64/40 |
| | | | 428/304.4 |
| 2015/0034604 A1 | 2/2015 | Subramanian et al. | |
| 2015/0314530 A1 | 11/2015 | Rogren | |
| 2017/0313047 A1* | 11/2017 | Kuo | B29C 64/236 |

FOREIGN PATENT DOCUMENTS

| | | |
|---|---|---|
| WO | 9325336 A1 | 12/1993 |
| WO | 2009010462 A2 | 1/2009 |
| WO | 2014109675 A1 | 7/2014 |
| WO | 2015151834 A1 | 10/2015 |
| WO | 2015171182 A1 | 11/2015 |

OTHER PUBLICATIONS

UKIPO Search Report; dated Jul. 21, 2016; 4 pages.
Chinese Office Action dated Dec. 4, 2020 with English summary for co-pending Chinese Patent Application No. 201780016256.3; pp. 19. All pages relevant.
Guangfu Liu et al., Raid Moulding and Rapid Tooling, Tongji University Press, 1st Edition. Relevant page (extracted) indicated by the Examiner is p. 114.

* cited by examiner

MANUFACTURING METHOD AND MANUFACTURING APPARATUS

PRIORITY CLAIMS

This invention claims priority to PCT Application Serial No. PCT/EP2017/055425 filed Mar. 8, 2017, which claims priority to Great Britain Application Serial No. 1604112.1 filed Mar. 9, 2016; the contents of which are hereby incorporated by reference.

TECHNICAL FIELD

The present disclosure relates to methods of manufacturing an object, and particularly to methods of manufacturing an object in which the object is constructed from a series of layers of construction material, regions of each of which are selectively bound together during or after the deposition of the layer, and before the deposition of a successive layer. The present disclosure also relates to manufacturing apparatus suitable for implementing such methods.

BACKGROUND

Three-dimensional printing is a class of additive manufacturing technologies in which sequential layers of material are deposited into a build region, portions of each layer being joined together so that a desired object is constructed by the joined portions of the sequential layers.

One three-dimensional printing technique employs a process in which sequential layers of a granular build material, such as a powder, are deposited into a build region from a print head which passes over and across the build region. After or during deposition of the layer, portions of the build material are selectively bound together. For example, a liquid binder may be jetted from the print head onto the build material using a technique similar to ink-jet printing. Such a binder may be an adhesive which solidifies or cures, thereby to bind the granules of the build material together, over time, for example by contact with the air in the case of an air-drying adhesive, or after curing, for example using ultraviolet light in the case of a UV-curable adhesive. Alternatively, radiation may be selectively applied to portions of each layer to locally sinter or melt regions of the layer, thereby binding such regions together, for example by the application of a suitably high-intensity laser beam or focused infrared radiation.

The deposited layers of powder are made sufficiently thin such that, when successive layers of powder are deposited having selective regions bound together, the bound parts of each layer extend through the layer to the boundary with an underlying layer so as to form a contiguous three-dimensional structure extending through two or more layers.

For additive manufacturing to be competitive with other manufacturing processes, it is desirable that additive manufacturing is able to manufacture a desired object to have appropriate properties at appropriate regions within the object.

SUMMARY

According to a first aspect of the present disclosure, there is provided an additive manufacturing method. In the method, regions of successively-deposited layers of granular construction material are bound together so as to form a three-dimensional structure of bound material extending through and between the layers. The method comprises depositing a first granular construction material as a layer into a build region. The method comprises selectively binding regions of the first granular construction material together to form bound regions within the layer. The method comprises removing unbound granular construction material from the layer so as to provide at least one void in the layer. The method comprises depositing a second granular construction material into the build region so as to fill the at least one void. The method comprises selectively binding regions of the second granular construction material together to form bound regions within the layer. In the method, the second granular construction material is different from the first granular construction material. The method is repeated to form the object.

In one implementation, the method comprises smoothing the deposited second granular construction material to a uniform thickness. The smoothing is performed before selectively binding regions of the second granular construction material together.

In one implementation, the method comprises smoothing the deposited first granular construction material to a uniform thickness. The smoothing is performed before selectively binding regions of the first granular construction material together.

In one implementation, removing unbound granular construction material from the layer comprises applying suction to the layer.

In one implementation, the first granular material has a different solubility than the second granular material, the different solubility being with regard to i) a polar solvent or ii) a non-polar solvent.

In one implementation, the method further comprises applying a solvent to the three-dimensional structure to dissolve portions of the structure formed from one of the first and second granular construction materials but not portions of the structure formed from the other of the first and second granular construction materials.

In one implementation, the deposition of the first granular construction material occurs in a pass of a deposition unit for depositing the granular construction material over the build region in a first direction. In the implementation, the deposition of the second granular construction material occurs in a pass of a deposition unit for depositing the second granular construction material over the print region in a second direction opposite to the first direction.

In one implementation, binding the first granular construction material occurs in a pass of a binding unit for binding the first granular material over the print region in a first direction. In the implementation, binding the second granular construction material occurs in a pass of a deposition unit for depositing the second granular construction material over the print region in a second direction opposite to the first direction.

In one implementation, the removed granular construction material is collected after removal.

In one implementation, the selective binding is performed for the first and second granular construction materials by selective application of a liquid binder using an ink-jet method.

According to a second aspect of the present disclosure, there is provided an additive manufacturing apparatus. The apparatus comprises means for depositing a first granular construction material and a second granular construction material into a build region to form a layer in the build region. The apparatus comprises means for selectively binding regions of the deposited layer together. The apparatus comprises means for removing unbound granular construction material from the build region.

In one embodiment, the means for depositing the first and second granular construction material comprises a first granular construction deposition unit arranged to reciprocate above the build region and to deposit the first granular construction material into the build region and a second granular construction deposition unit arranged to reciprocate above the build region and to deposit the second granular construction material into the build region.

In one embodiment, the means for selectively binding regions of the deposited layer together comprises an inkjet binding unit arranged to reciprocate above the build region and to selectively deposit a liquid binder into the build region.

In one embodiment, the apparatus further comprises a curing unit arranged to reciprocate above the build region and to apply UV radiation to the deposited binder thereby to cure the deposited binder.

In one embodiment, the means for removing unbound granular construction material from the build region comprises a suction unit arranged to reciprocate above the build region.

In one embodiment, the apparatus further comprises a smoothing element arranged to reciprocate above the build region for smoothing a top surface of the deposited layer.

In one embodiment, the apparatus has one or more operative units selected from binding units, curing units, removal units, and suction units arranged respectively on independently-reciprocating carriages.

In one embodiment, a removal unit is arranged on a carriage which is independently movable relative to a carriage on which a binding unit is arranged.

In one embodiment, a removal unit is arranged on a reciprocating carriage which is independently movable relative to a reciprocating carriage on which a granular construction material deposition unit is arranged.

In one embodiment, the build region is defined by a well formed in a surface of a build table. In the embodiment, a bottom surface of the well is defined by a build plate. In the embodiment, the build plate is progressively movable from a first position closer to the surface of the build table to a second position further from the surface of the build table.

In one embodiment, the apparatus has a controller operable to cause the apparatus to perform an implementation of the method of the first aspect.

BRIEF DESCRIPTION OF THE DRAWINGS

For a better understanding of the present invention, and to show how the same may be carried into effect, reference will be made, by way of example only, to the accompanying Drawings, in which.

DETAILED DESCRIPTION

The present disclosure relates to a 3D printing technology in which an object is constructed from a series of successively deposited layers, portions of which are joined together both within the layer and with portions of an underlying layer. In particular, the present disclosure relates to powder bed 3D printing, in which layers of powder (or another granular construction material) are successively deposited, regions of each layer being bound together to form portions of a desired object before the next successive layer is deposited.

The present disclosure will be exemplified in relation to a powder bed and ink jet head 3D printing system, in which a binder is selectively jetted from a scanning ink jet head onto a previously-deposited bed of granular construction material. However, the disclosure is not to be so limited, and the concepts disclosed herein are applicable to other additive manufacturing techniques involving the binding together of a previously-deposited powder layer, including selective laser sintering and local melting manufacturing.

Figure 1:
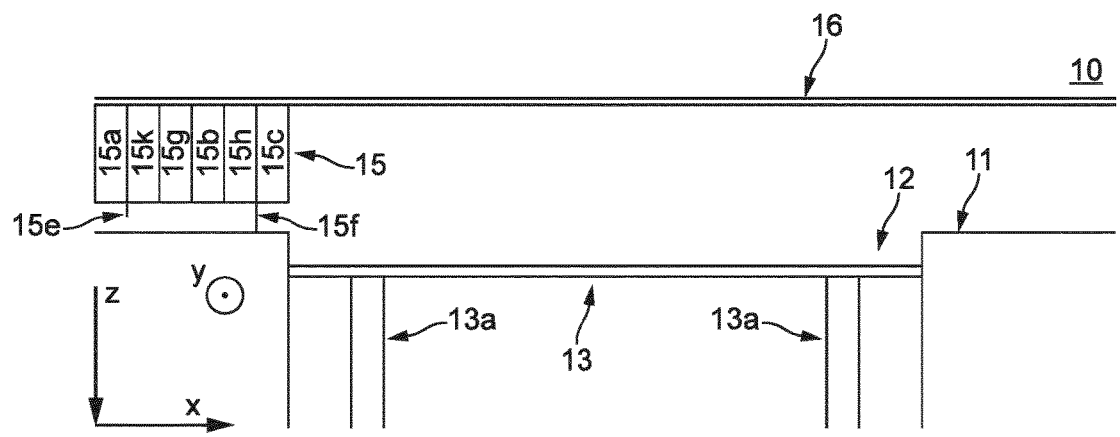
FIG. 1 shows a first state of an additive manufacturing apparatus being a first embodiment of the present invention.

FIG. 1 shows a schematic view of a powder bed and ink jet head additive manufacturing apparatus 10. Apparatus 10 has a print table 11, into an upper surface of which well 12 is formed. Within well 12 is provided displaceable platform 13, which is arranged to be displaceable within well 12 in a first direction Z which, in the configuration of FIG. 1, is perpendicular to a surface plane of table 11. Platform 13 is, in the present configuration, supported by retractable supports 13a which are retractable in a controlled manner to effect the lowering of platform 13 into well 12. For example, the retractable supports may be provided with toothed portions which enable the supports to be retracted in a controlled manner through the operation of toothed wheels, in the manner of a rack and pinion drive. Alternatively, and for example only, the retractable supports may be hydraulically retractable, electromagnetically retractable or retractable by some other mechanism, without limitation. Provision of a single support, or several such supports, is also contemplated.

Apparatus 10 also includes print head 15, which is arranged to traverse above well 12 in a first direction X, while being supported above the well as it translates. In the embodiment of FIG. 1, the first direction X is parallel to the surface plane of table 11. In the embodiment of FIG. 1, print head 15 is supported on rail 16, along which it is arranged to move. Print head 15 may be moved in a reciprocating fashion over well 12 by, for example, a drive belt, a drive screw, an internal drive motor or any other suitable means. Importantly, print head 15 is able to traverse across the full extent of well 12 in the X-direction.

It must be noted that, while the illustration of FIG. 1 depicts the X-Z plane in transverse section, well 12 has extent in a third direction Y perpendicular to the X and Z directions and, for example, extending out of the page. Table 11 and platform 13 have extent in this direction also, but have no further special limitation as to the shape or dimension in this direction. For example, when viewed along the Z-direction, well 12 could have a rectangular or square shape in plan view, but also could have other shapes, including polygonal or circular. The cross-section of well 12 does not vary with extent in the Z direction, while platform 13 has a plan view so as to be a close fit to the vertical walls of well 12 relative to which platform 13 moves. Accordingly, a volume is able to exist below the surface of table 11 between the vertical walls of well 12 and platform 13 into which powder can be dispensed such that substantially no powder leaks between sides of well 12 and the edges of platform 13. Platform 13 may be provided with seals, such as resilient wipers, at each edge to avoid such leakage between the edges of platform 13 and sides of well 12.

Print head 15 also has extent in the Y direction such that print head 15 is able to pass across the entire X-Y cross-sectional extent of well 12 while moving in the X direction. This can be achieved by providing a print head 15 which extends the full length of the well in the Y-direction. Alternatively, this can be achieved by providing a print head, one or more components of which are arranged to reciprocate in the Y-direction to scan the surface of the well in a raster fashion, such that, as the print head traverses the well in the X-direction, whether continuously or stepwise, the component of the print head which reciprocates in the Y-direction passes across every point of the well in the X-Y plane. Such a reciprocating print head can be provided using, for example, a reciprocating belt drive as known from, for example, conventional inkjet printer technology.

The configuration outlined above is common to powder bed and ink jet head 3D printers as previously known to the inventors.

In the embodiment of FIG. 1, print head 15 includes two powder deposition units 15a, 15c arranged sequentially in the X direction, each being adapted to dispense a layer of a powder into well 12 as print head 15 traverses the well in the X-direction. In the present embodiment, each powder deposition unit 15a, 15c has a respective dispensing orifice which extends the full width of well 12 in the Y-direction such that, when the print head 15 traverses well 12, a full layer of powder may be dispensed from the orifice. In alternative configurations, each powder deposition unit 15a, 15c may be formed as a scanning component which dispenses successive rows of powder in the Y-direction, the rows being arranged sequentially in the X-direction.

Each powder deposition unit 15a, 15c is respectively connected to a different powder reservoir.

Print head 15 also includes a binding unit 15b arranged between powder deposition units 15a, 15c in the X-direction. In the present embodiment, binding unit 15b includes an ink jet head arranged to jet binder into well 12 as print head 15 passes across well 12. By selectively jetting the binder as the print head 15 traverses well 12, portions of each layer of powder deposited by powder deposition unit 15b can be selectively bound together, in order to form one layer of the object to be manufactured.

Binding unit 15b could, in one configuration, be provided as a scanning ink-jet head which reciprocates in the Y-direction and is operable to deposit drops of a binder at predetermined locations in a row in the Y-direction, before or while the print head advances in the X-direction, so that the binder dispenser can selectively deposit binder at locations on each successive row. Alternatively, each binder dispenser may comprise a single ink-jet head extending in the Y-direction the full extent of the well and having a plurality of binder dispensing orifices arranged in a row in at least the Y-direction such that, by activating individual orifices of the binder dispenser while the print head 15 translates across well 12 in the X-direction, binder may be deposited to selected locations in the X-Y plane of the well. A combination of these approaches is also possible, in which each binder dispenser is be arranged to translate in the Y-direction, but also includes plural orifices arranged in at least the Y-direction. The orifices of the print head 15 may also be arranged in the X direction, for example as a tilted linear array, for example in order to achieve closer spacing in the Y-direction as between the orifices.

In the present embodiment, print head 15 additionally includes at least one smoothing element, such as a doctor blade or smoothing roller, arranged thereon and adapted to provide a smoothing surface which is able to level the upper surface of the dispensed powder layer as print head 15 traverses well 12 so as to achieve a uniform layer thickness. In the present embodiment, for example, such a first smoothing blade 15e is arranged between powder deposition unit 15a and binding unit 15b in the first direction and a second smoothing blade 15f is arranged between binding unit 15b and powder deposition unit 15a in the first direction. In the present embodiment, the smoothing element (smoothing blade) has an adjustable position of a smoothing surface (lower smoothing edge) thereof in at least the Z-direction, such that the smoothing surface can be retracted or extended between at least two positions in the Z-direction, and optionally among a set of various positions. In other embodiments, however, the smoothing element or smoothing elements may have a fixed position.

Further, for use with binders which require active curing, for example by a UV light, print head 15 may include one or more curing units, such as a UV lamp, associated with the binding unit 15b. In the present embodiment, a first curing unit 15g is provided on one side of binding unit 15b in the X direction and a second curing unit 15h is provided on the other side of binding unit 15b in the X direction. In other embodiments, a single curing unit may be provided, for example, such that the curing unit acts to cure either binder that has just been dispensed by the binding unit or binder of the previous layer to the layer onto which binder is being dispensed in a given printing pass.

In the embodiment of FIG. 1, print head 15 also includes, as a powder removing unit, suction unit 15k adapted to suck powder from beneath the suction unit. In the present embodiment, suction unit 15k is arranged behind binding unit 15b in the X direction and in front of powder deposition unit 15a in the X direction. In the present embodiment, suction unit 15k comprises a suction orifice 15x extending the width of print head 15 which is connected via a valve to a source of suction such as a vacuum pump or a utility vacuum line. In the present embodiment, a powder collector is provided downstream of suction orifice 15x with respect to the direction of suction to collect removed powder. Accordingly, removed powder may be collected and recycled, and it can be avoided that removed powder travels to the source of suction.

In the present embodiment, suction orifice 15x is sufficiently separated from binding unit 15b and powder deposition unit 15a such that the operation of suction unit 15k does not disturb a binding operation or a powder deposition operation. In other embodiments, the suction unit may be placed closer together with a particular component (such as a powder deposition unit or binding unit), provided that that component is not actuated in the same printing pass as the suction unit.

In variant embodiments, suction unit 15k may operate on a principle of electrostatic suction or, for a magnetic powder, may operate on a principle of magnetic suction. In a further variant embodiment, as an alternative to suction unit 15k, the powder removing unit may be provided as a blowing unit adapted to blow the powder away from beneath the blowing unit. In such an embodiment, a separate suction device may be provided in the vicinity of the build region to remove powder blown by the blowing unit, for example fixed relative to the well 12.

The operation of the embodiment of FIG. 1 will now be described. In FIG. 1, the upper surface of platform 13 which, in the embodiment of FIG. 1 is flat and parallel to the X-Y plane, has been retracted a short distance below the surface of table 11 to provide a build region (or build volume) into which a layer of powder may be dispensed. The depth of the build region, and consequently the depth of the layer of powder to be dispensed above platform 13, may be selected such that the entirety of the depth of the layer may be selectively bound at a particular location through the action of the binding units, in order that one layer may be bound to a bound portion of the previous layer, without undesirably binding together substantial portions of the previous layer.

Figure 2:
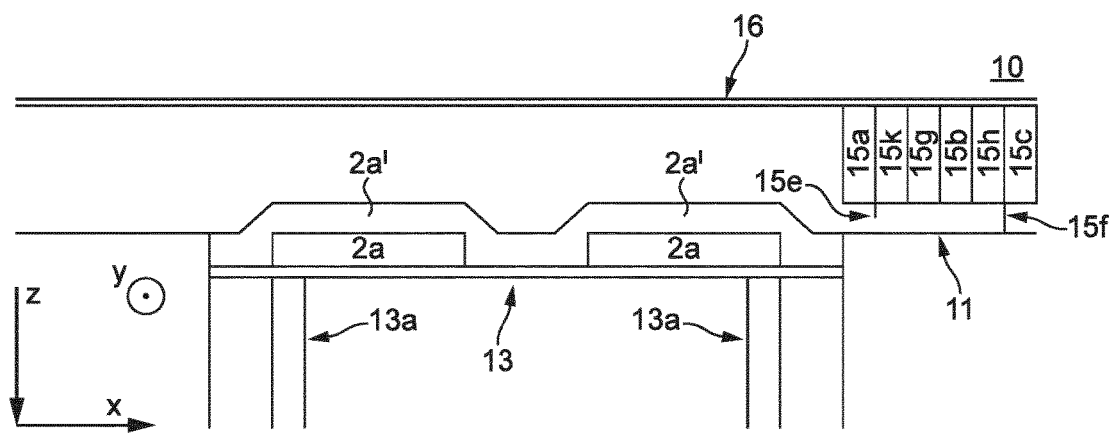
FIG. 2 shows a second state of an additive manufacturing apparatus being a first embodiment of the present invention.

From the configuration shown in FIG. 1, print head 15 traverses well 12 in the forward (X) direction to deposit a layer 2a of first powder into the well on the surface of platform 13 from the dispensing orifice of powder deposition unit 15c. Also, as the print head traverses in the forward direction, smoothing blade 15f is in the lowered state and smoothing blade 15e is in the retracted state. Hence, the smoothing blade 15f acts to smooth the top surface of the deposited powder to be substantially level, providing a uniform thickness to layer 2a. Also, as the print head traverses in the forward direction, binding unit 15b selectively deposits binder onto portions of the smoothed, deposited layer to selectively bind portions of that layer together. Also, as the print head traverses in the forward direction, curing unit 15g applies UV light to the deposited binder to cure the binder. Also, as the print head traverses in the forward direction, suction unit 15k acts to remove unbound powder remaining after the selectively bound regions have been bound together and cured, thereby to leave a void or voids into which further powder may be dispensed. Also, as the print head traverses in the forward direction, powder deposition unit 15a operates to dispense a partial layer 2a' of second powder into the void or voids created by the use of the suction unit 15k, as well as on top of the bound regions of the first powder which remain after the removal of the unbound powder. The resultant configuration is shown in FIG. 2.

Once partial layer 2a' has been deposited, print head 15 travels in the reverse (-X) direction with smoothing blade 15e in the lowered state and smoothing blade 15f in the retracted state. Hence, the smoothing blade 15e acts to smooth the top surface of the deposited second powder to be sufficiently level, as well as to remove unbound powder from on top of the bound regions of the first powder. The aggregate layer thus also is provided with a uniform thickness. Also, as the print head traverses in the reverse direction, binding unit 15b selectively deposits binder onto portions of the smoothed, deposited layer to selectively bind portions of that layer together. This allows binding unit 15b to apply binder to unbound regions of the second powder deposited in the previous pass in the forward (+X) direction. Also, as the print head traverses in the reverse direction, curing unit 15h applies UV light to the deposited binder to cure the binder. By such a process, a layer having regions of two different powders, each selectively bound together, as well as unbound regions of the second powder, is created, so as to arrive at the state shown in FIG. 3.

In a variant, the powder deposition unit 15a may be selectively actuated only above regions from which the first powder has been removed so as to prevent the deposition of powder in lines or regions in which there is no void to accommodate the second powder.

If the powders are chosen to have different properties, then the different regions of the layer which are formed of different powders will have correspondingly different properties.

For example, if different coloured powders are used, then a layer having different coloured regions can be produced. A coloured powder can be produced, for example, by applying a dye with a desired colour to a ceramic powder.

Alternatively or additionally, if powders having different physical properties are used, then a layer having different physical properties can be produced. For example, if different alloys are used to form the powders, then regions having different thermal conductivities, different tensile strengths or different densities can be produced.

Alternatively or additionally, if powders having different chemical properties are used, then a layer having different chemical properties can be produced. For example, if different materials are used to form the powders, then regions having different solubilities, different reactivities or different interaction strengths with a binder can be produced. For example, if the two powders are a soluble material, such as a soluble polymer, and an insoluble material, such as an insoluble ceramic, for a given solvent, parts of which may be dissolved by solvent infiltration or immersion, can be formed. Such an approach allows the formation of complex products which may be difficult to form by other methods, and especially products which include support regions which are needed for structural stability during the manufacturing process, including further processing such as machining of the printed part, but which are desired to be absent in the finished product. The solvent may be non-polar, such as hexane or toluene, or polar, such as acetone, ethanol or water.

After the reverse pass in the -X direction, platform 13 is further lowered, for example by the intended thickness of the next layer, and one or more further layers are deposited by a similar process on top of the first aggregate layer formed of partial layer 2a and partial layer 2b.

In some configurations, binder may not be deposited at all on the first layer of powder deposited on table 13, in order to allow the printed object to be easily released from the upper surface of table 13.

Figure 4:
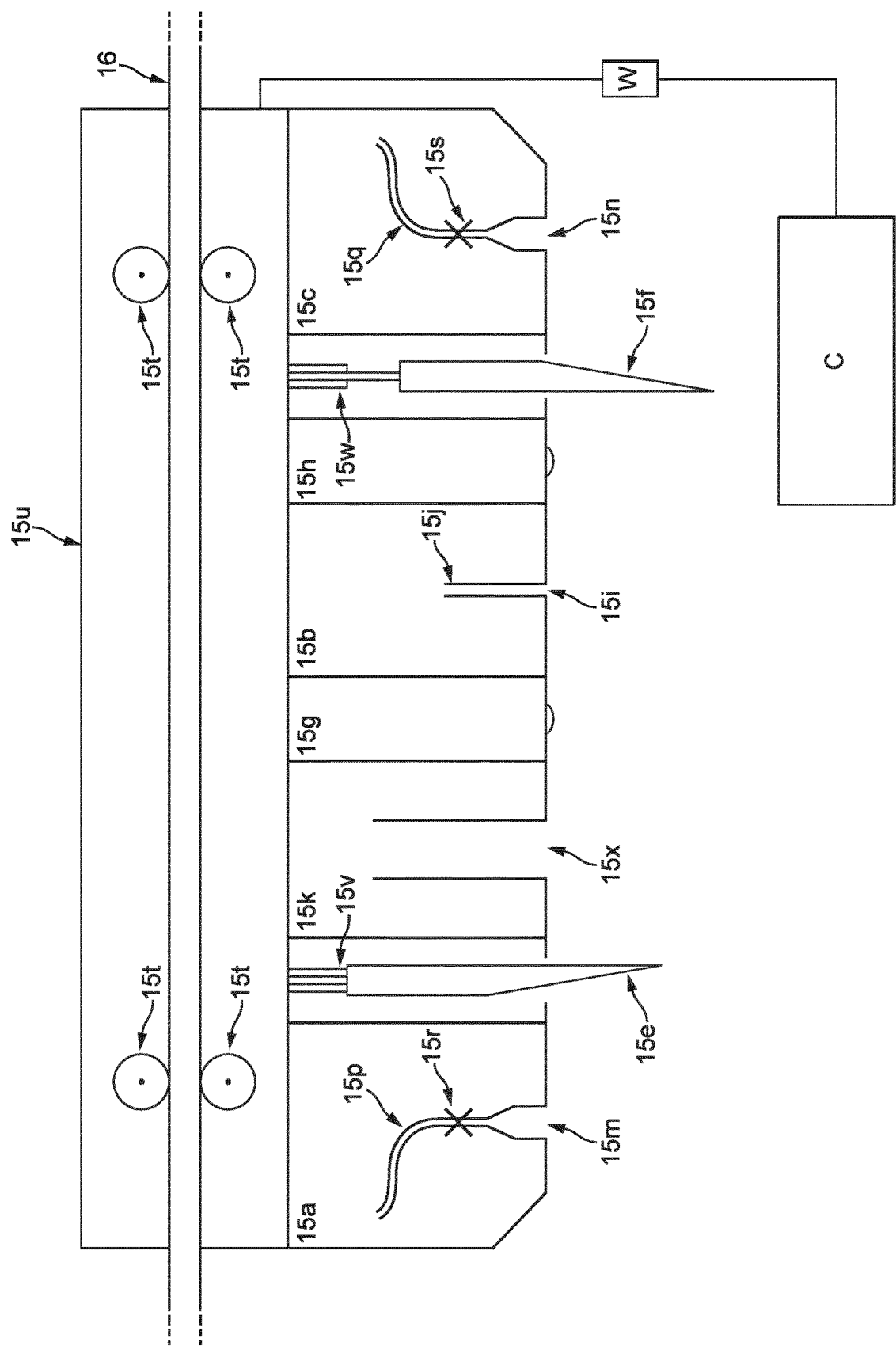
FIG. 4 shows a schematic view of a print head forming part of a first embodiment of the present invention.

FIG. 4 shows a schematic view of print head 15, showing clearly the powder deposition units 15a and 15c, curing units 15g, 15h, removal unit 15k, smoothing blades 15e, 15f, and binding unit 15b.

Each powder deposition unit 15a, 15c has a respective powder-dispensing orifice 15m, 15n which is connected via a supply tube 15p, 15q to a respective external reservoir for powder. Each respective powder reservoir may be provided supported on print head 15. Alternatively, each respective powder reservoir may be external to print head 15 and the powder, which may be appropriately fluidised, may be delivered from the external reservoir to the respective supply tube 15p, 15q. Each powder deposition unit 15a, 15c also includes a respective valve unit 15r, 15s, which may be a blade valve, and which functions to actuate the dispensing of the powder from the respective supply tube 15p, 15q through the respective supply orifice 15m, 15n. However, the supply of powder through each respective orifice may be selectively actuated by other means such as are known in the art. Supply of powder from each powder deposition unit is independently actuable.

Positioned between powder deposition unit 15a and powder deposition unit 15c is binding unit 15b, which has an ink-jet orifice 15*i* connected via supply duct 15*j* to a binder reservoir. Print head 15 may be connected to the external reservoir, for example, by suitable length of flexible tubing. Ink-jet orifice may be actuable to dispense droplets of binder.

Positioned either side of binding unit 15*b* are curing units 15*g*, 15*h*, each of which is provided with a UV lamp of wavelength and intensity suitable to cure the dispensed binder. Each UV curing unit may be independently actuable.

Positioned on a binding-unit-side of each powder deposition unit 15*a*, 15*c* is a respective smoothing device 15*e*, 15*f*, here a smoothing blade. Each smoothing device 15*e*, 15*f* is movable between an extended position and a retracted position by a respective actuation unit 15*v*, 15*w*, here provided as respective solenoid units. Each smoothing device may be independently actuable between the extended and retracted position.

Positioned between powder deposition unit 15*a* and powder deposition unit 15*c* is powder removal unit 15*k*, which has a removal orifice 15*x* connected source of suction. In the depicted embodiment, powder removal unit is arranged between smoothing device 15*e* and curing unit 15*g*, although other locations may be contemplated. Powder removal unit 15*k* may be connected to an external source of suction, such as a factory vacuum service line, or an internal source of suction such as a fan, for example, by a suitable length of tubing. Either by selective actuation of the source of suction or by selective actuation of a valve between the source of suction and the removal orifice 15*x*, for example, the powder removal unit can selectively apply suction at the removal orifice 15*x*.

Print head 15 may be driven along rail 16 in the X-direction by pairs of drive rollers 15*t*, which respectively in pairs clamp rail 16 between them, and which are, for example, electrically drivable to effect movement in the forward and reverse X-direction of print head 15. The entirety of print head 15 is in the disclosed embodiment enclosed within external shell 15*u*, such that powder deposition units 15*a* and 15*c*, curing units 15*g*, 15*h*, removal unit 15*k*, smoothing blades 15*e*, 15*f*, and binding unit 15*b* share a common carriage.

The operation of the disclosed embodiment is controlled by a controller C, which drives the various disclosed elements in accordance with control logic so as to perform the methods herein disclosed. The controller may be provided in the form of, for example, an industrial PC, and the control logic may be provided, for example, in the form of machine-readable instructions stored on a non-transitory medium. The controller may be connected to the print head via a wiring loom W. The controller C may accept source data defining the object to be manufactured, for example as raster data for each of a succession of layers or as voxel data for a volume, and may take account of the source data as well as the control logic when driving the various disclosed elements so as to manufacture an object defined by the source data.

However, an implementation is possible in which, for example, print head 15 shown in FIG. 4 is divided into several separate carriages, each being provided with its own drive means, the carriages respectively containing subsets of the print components such as powder deposition units 15*a* and 15*c*, curing units 15*g*, 15*h*, removal unit 15*k*, smoothing blades 15*e*, 15*f*, and binding unit 15*b*. The driving of each of the separate carriages in the X-direction may be thereby be independently effected, and particularly may be effected at respectively different speeds, appropriate to the operation to be performed with each carriage.

Figure 5:
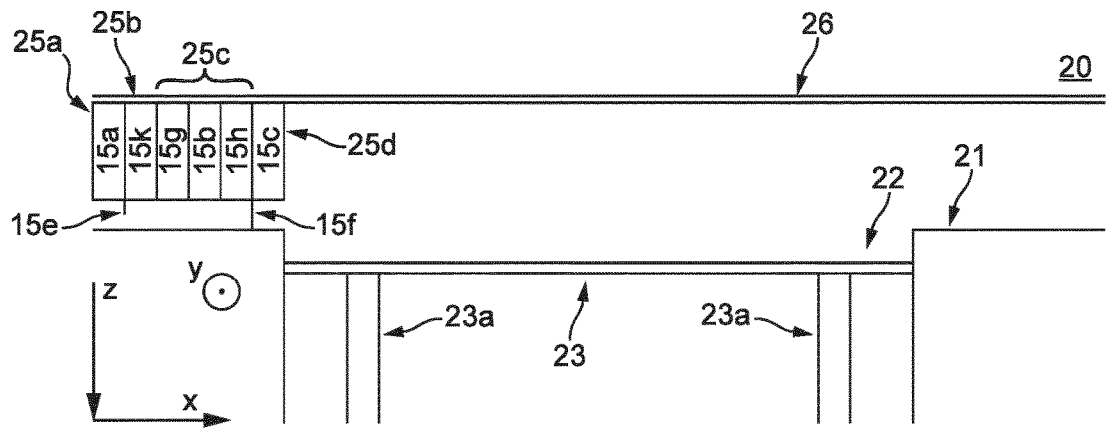
FIG. 5 shows a first state of an additive manufacturing apparatus being a second embodiment of the present invention.

For example, as shown in FIG. 5, printing apparatus 20 has five carriages 25*a*, 25*b*, 25*c*, and 25*d* each arranged to translate along common rail 26 in the X-direction above well 22 formed in table 21 so as to deposit and bind layers of material arranged on movable support platform 23. Carriages 25*a* and 25*d* are provided respectively with powder deposition units 15*a* and 15*c*, as well as smoothing blades 15*e* and 15*f*. Carriage 25*c* is provided with binding unit 15*b* having curing units 15*g*, 15*h* arranged either side of the binding unit in the X-direction. Carriage 25*b* is provided with suction unit 15*k*.

Figure 6:
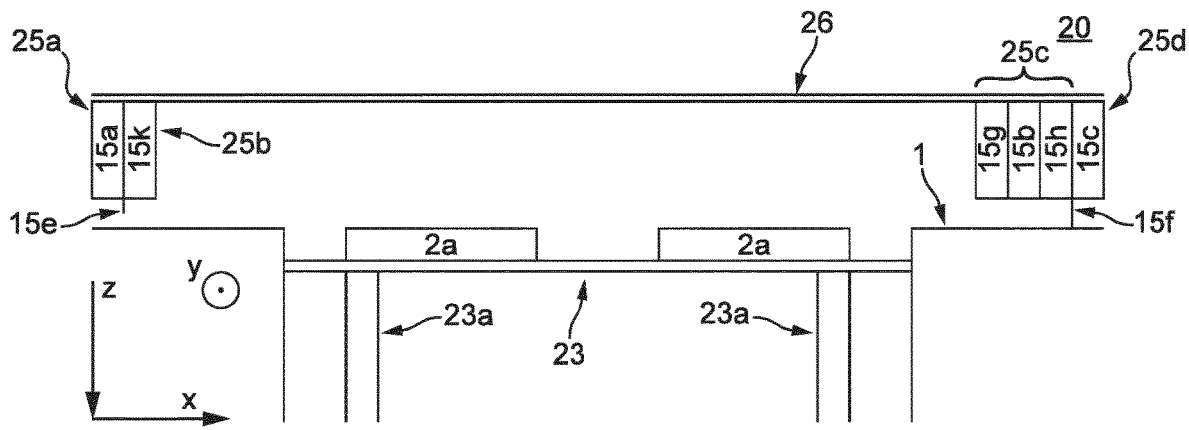
FIG. 6 shows a second state of an additive manufacturing apparatus being a second embodiment of the present invention.

From the configuration shown in FIG. 5, carriages 25*c* and 25*d* together traverse in the forward (X) direction across well 22 such that a layer of first powder is deposited from powder deposition unit 15*d*, which is then selectively bound by binding unit 15*c* and cured by curing unit 15*g* to form the state shown in FIG. 6. Carriages 25*c* and 25*d* may travel together at the same speed and in an adjacent formation, or carriage 25*d* may depart earlier or may move faster than carriage 25*c*, as may be desired.

Figure 3:
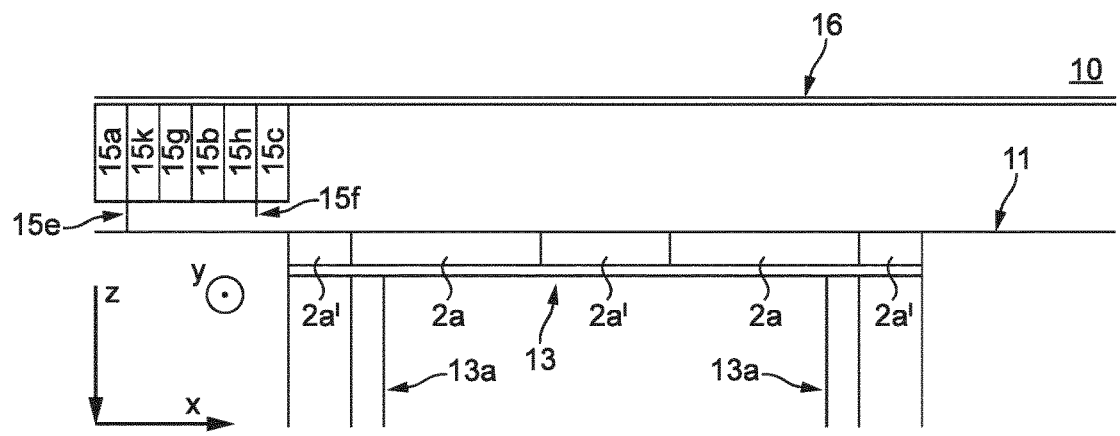
FIG. 3 shows a third state of an additive manufacturing apparatus being a first embodiment of the present invention.

From the configuration shown in FIG. 6, carriage 25*b* traverses in the forward direction across well 22 such that suction unit 15*k* removes unbound powder, to form a state similar to that shown in FIG. 3.

From that state, carriage 25*a* traverses in the forward direction across well 22 such that powder deposition unit 15*a* is able to deposit a layer 2*a*' of second powder in the void or voids created by the use of the suction unit 15*k*, as well as on top of the bound regions of the first powder which remain after the removal of the unbound powder.

Once layer 2*a*' has been deposited, carriages 25*a*, 25*b*, 25*c* and 25*d* travel together in the reverse (−X) direction with smoothing blade 15*e* in the lowered state and smoothing blade 15*f* in the retracted state. Hence, the smoothing blade 15*e* acts to smooth the top surface of the deposited second powder to be sufficiently level, as well as removing unbound powder from on top of the bound regions of the first powder. Also, as the carriage 25*c* traverses in the reverse direction, binding unit 15*b* selectively deposits binder onto portions of the smoothed, deposited layer to selectively bind portions of that layer together. This allows binding unit 15*b* to apply binder to unbound regions of the second powder deposited in the previous pass in the forward (+X) direction.

By such a process, a layer having regions of two different powders, each selectively bound together, as well as unbound regions of the second powder, is created.

Carriages 25*a*, 25*b*, 25*c* and 25*d* may travel together at the same speed and in an adjacent formation, or carriage 25*a* may depart earlier or may move faster than carriage 25*b*, as may be desired, as may also be true for carriage 25*b* and carriage 25*c*, and for carriage 25*c* and carriage 25*d*.

Figure 7:
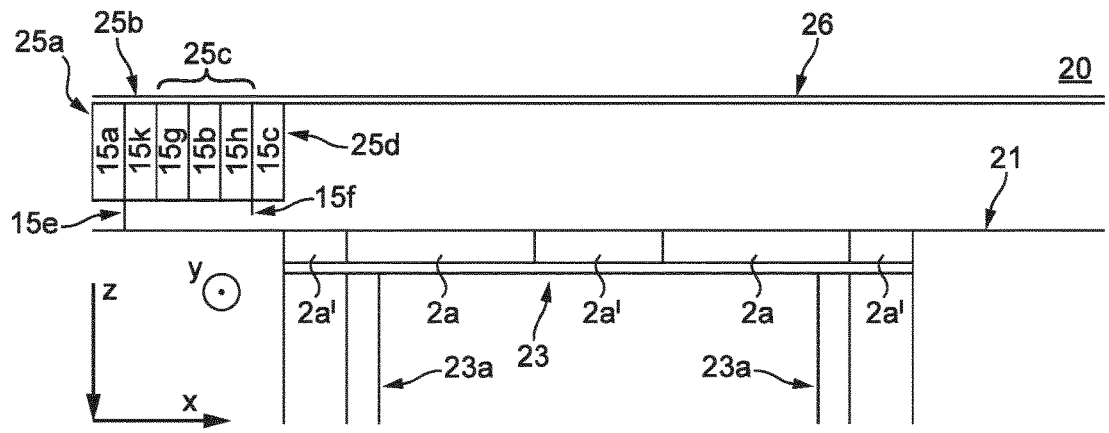
FIG. 7 shows a third state of an additive manufacturing apparatus being a second embodiment of the present invention.

After carriage 25*d* has completed its transit of well 22, the state shown in FIG. 7 is achieved, in which all carriages 25*a*, 25*b*, 25*c* and 25*d* are together arranged on one side of well 12.

Of course, from the position shown in FIG. 5, it is not required to wait for carriages 25*c* and 25*d* to arrive on the other side of well 22 before carriage 25*b* begins its transit. Similarly, it is not required to wait for carriage 25*b* to arrive on the other side of well 22 before carriage 25*a* begins its transit. Indeed, in some situations, where for example when the speed of transit of carriage 25*d* having powder deposition unit 25*c* is reduced, for example to allow an even layer or sufficient depth of powder to be deposited, as compared with the transit speed of carriage 25*c* having binding unit 25*b*, it may be preferable for carriage 25*c* having binding unit 15*b* to begin its transit before carriage 25*d* has completed its transit. In such configurations, it may be selected that carriage 25c completes its transit at the same time as, or shortly after, carriage 25d completes its transit. Similarly, the movement of the carriage 25b having removing unit 15k can be controlled relative to the movement of carriage 25a and 25c such that actuation of removing unit 15k does not disturb powder deposition or binder deposition.

Where carriages disclosed in the above need only travel together with another carriage, such carriages can be combined into a single carriage. Conversely, in some circumstances it may be decided to reserve other parts such as curing units and smoothing devices to independent carriages.

Further, the disclosure of the above can be extended to provide for up to three, four or more powders being used to form the finished object, by providing several powder deposition units.

In another variant, only a single powder deposition unit is provided having a dispensing orifice linked to several different powder reservoirs by a switching valve, such that the different powders may be applied into a single layer at different times by appropriate selection of the switching valve. So, for example, on a first deposition pass, a first layer of selectively bound powder can be deposited using the powder deposition unit, that layer can be selectively bound, and then unbound regions of that layer can be removed. Then, on a second deposition pass, a different powder can be applied into the layer, and again bound as required. The platform 13 is then further lowered, for example by the intended thickness of the next layer, one or more further layers deposited. The second deposition pass may be a forward (X) or reverse (−X) deposition pass, as may be desired.

In a further variant, more than one binding unit may be provided, for example to provide for the binding of the various construction materials with appropriate binding methods. As just one example, metal powder construction material could be bound with selective laser sintering by a binding unit which selectively applies a laser beam to locally heat the metal powder, whereas a ceramic powder construction material could be bound by applying a UV-curable liquid binder via an ink-jet head.

Depending on the removal strength, for example suction strength of the removal unit, it may be necessary to bind any unbound regions of an otherwise-finished layer, for example by applying a weak binding to at least those unbound regions before the next layer is deposited. Such a weak binding could, for example, be achieved by applying a water-soluble binder, or a smaller quantity of UV-curable binder. This can avoid a circumstance in which, due to a powerful suction from the removal unit, unbound regions of powder from a previous layer become disturbed. Such weakly-bound regions can be removed from the finished object after manufacture, for example by applying a suitable solvent, such as water, or for example by mechanical brushing.

Although the above disclosure has been made with regard to a print head which provides certain operations on a forward pass and certain other operations on a reverse pass, the above disclosure may also be implemented on a print head which applies one or more operations on a forward pass only, for example. In such a case, it may be required to provide additional components such as further binding units, curing units, smoothing elements, powder removal units and powder deposition units on the print head in a proper sequence to allow all needed operations to be accomplished in a single pass. Such may increase the complexity of the print head, but may reduce the complexity of the required control.

Further, although the above disclosure has been made with regard to a print head which reciprocates in at least a first linear direction above a well defining the printing region, the above disclosure is also applicable to applications in which a print head is arranged to extend radially from the central axis of a build region and to sweep a circular pass around the axis to deposit powder into the circular build region and to selectively bind regions of the powder together.

Particularly, the above disclosures are applicable to a wide variety of 3D printing technologies other than those specifically described, including the use of ceramic, polymer and metal powder construction materials, reactive, UV-curable, contact-curable or other jetted binders, or other binding techniques such as laser or thermal binding. One particular embodiment uses a metal powder and a polymer binder. In such implementations, a sintering process may be applied to the metal powder after the object is removed from the printing apparatus.

The above disclosures are considered only exemplary. It is expected that those skilled in the art would be able to implement the above disclosure with such modifications, substitutions, alternatives or variations as may be required to meet particular engineering requirements without undue burden.

The invention claimed is:

1. An additive manufacturing method in which regions of successively deposited layers of granular construction material are bound together so as to form a three-dimensional structure of bound material extending through and between the layers, the method comprising repetitively:
   depositing a first granular construction material as a layer into a build region;
   selectively binding regions of the first granular construction material together to form bound regions within the layer;
   removing unbound granular construction material from the layer so as to provide at least one void in the layer;
   depositing a second granular construction material into the build region so as to fill the at least one void;
   selectively binding regions of the second granular construction material together to form bound regions within the layer,
   wherein the second granular construction material is different from the first granular construction material,
      wherein the first granular material has a different solubility than the second granular material, the different solubility being with regard to a polar or non-polar solvent; and
   applying the solvent to the three-dimensional structure to separate a portion of the structure formed from the first granular construction material from a portion of the structure formed from the second granular construction material.

2. The method of claim 1, further comprising:
smoothing the deposited second granular construction material to a uniform thickness before selectively binding regions of the second granular construction material together.

3. The method of claim 1, further comprising:
smoothing the deposited first granular construction material to a uniform thickness before selectively binding regions of the first granular construction material together.

4. The method of claim 1, wherein removing unbound granular construction material from the layer comprises applying suction to the layer.

5. The method of claim 1, applying the solvent to the three-dimensional structure includes applying the solvent to dissolve the portion of the structure formed from one of the first granular construction material or the second granular construction material but not portions of the structure formed from the other of the first granular construction material or the second granular construction material.

6. The method of claim 1, wherein
the deposition of the first granular construction material occurs in a pass of a deposition unit for depositing the granular construction material over the build region in a first direction at a first position in a second dimension that is transverse to the first direction, and
the deposition of the second granular construction material occurs in a pass of a deposition unit for depositing the second granular construction material over the print region in a second direction opposite to the first direction at the first position in the second dimension after the pass of the deposition unit for depositing the first granular construction material in the first direction at the first position in the second dimension and before the deposition unit for depositing the first granular construction material moves to another position in the second dimension.

7. The method of claim 1, wherein
binding the first granular construction material occurs in a pass of a binding unit for binding the first granular material over the print region in a first direction at a first position in a second dimension that is transverse to the first direction, and
binding the second granular construction material occurs in a pass of a binding unit for binding the second granular construction material over the print region in a second direction opposite to the first direction at the first position in the second dimension after the pass of the deposition unit for depositing the first granular construction material in the first direction at the first position in the second dimension and before the deposition unit for depositing the first granular construction material moves to another position in the second dimension.

8. The method of claim 1, wherein removing unbound granular construction material provides removed granular construction material, and the removed granular construction material is collected after removal.

9. The method of claim 1, wherein the selective binding is performed for the first and second granular construction materials by selective application of a liquid binder using an ink-jet method.

10. The method of claim 1, further comprising:
dissolving at least a portion of bound regions of the first granular construction material; and
sintering bound regions of the second granular construction material.

11. The method of claim 1, further comprising:
dissolving at least a portion of bound regions of the second granular construction material; and
sintering bound regions of the first granular construction material.

12. The method of claim 1, further comprising:
dissolving at least a portion of a bound region of the first granular construction material; and
after dissolving the portion of the bound region of the first granular construction material, sintering a bound region of the second granular construction material.

13. The method of claim 1, further comprising:
dissolving at least a portion of a bound region of the second granular construction material; and
after dissolving the portion of the bound region of the second granular construction material, sintering a bound region of the first granular construction material.

14. An additive manufacturing method in which regions of successively deposited layers of granular construction material are bound together so as to form a three-dimensional structure of bound material extending through and between the layers, the method comprising repetitively:
depositing a first granular construction material as a layer into a build region;
selectively binding regions of the first granular construction material together to form bound regions within the layer;
removing unbound granular construction material from the layer so as to provide at least one void in the layer;
depositing a second granular construction material into the build region so as to fill the at least one void;
selectively binding regions of the second granular construction material together to form bound regions within the layer,
wherein the second granular construction material is different from the first granular construction material, wherein
the deposition of the first granular construction material occurs in a pass of a deposition unit for depositing the granular construction material over the build region in a first direction and
the deposition of the second granular construction material occurs in a pass of a deposition unit for depositing the second granular construction material over the print region in a second direction opposite to the first direction; and
applying a solvent to the three-dimensional structure to separate a portion of the structure formed from the first granular construction material from a portion of the structure formed from the second granular construction material.

15. The method of claim 14, wherein the pass of the deposition unit for depositing the first granular construction material occurs in the first direction at a first position in a second dimension that is transverse to the first direction, and the pass of the deposition unit for depositing the second granular construction material occurs in the second direction at the first position in the second dimension after the pass of the deposition unit for depositing the first granular construction material in the first direction at the first position in the second dimension and before the deposition unit for depositing the first granular construction material moves to another position in the second dimension.

16. The method of claim 15, wherein a smoothing blade smooths the first granular construction material before the pass of the deposition unit for depositing the second granular construction material.

17. The method of claim 16, wherein a suction unit creates the at least one void after the smoothing blade smooths the first granular construction material and before the pass of the deposition unit for depositing the second granular construction material.

18. An additive manufacturing method in which regions of successively deposited layers of granular construction material are bound together so as to form a three-dimensional structure of bound material extending through and between the layers, the method comprising repetitively:

depositing a first granular construction material as a layer into a build region;

selectively binding regions of the first granular construction material together to form bound regions within the layer;

removing unbound granular construction material from the layer so as to provide at least one void in the layer;

depositing a second granular construction material into the build region so as to fill the at least one void;

selectively binding regions of the second granular construction material together to form bound regions within the layer, wherein the second granular construction material is different from the first granular construction material, wherein binding the first granular construction material occurs in a pass of a binding unit for binding the first granular material over the print region in a first direction and binding the second granular construction material occurs in a pass of a binding unit for binding the second granular construction material over the print region in a second direction opposite to the first direction; and applying a solvent to the three-dimensional structure to separate a portion of the structure formed from the first granular construction material from a portion of the structure formed from the second granular construction material.

19. An additive manufacturing method in which regions of successively deposited layers of granular construction material are bound together so as to form a three-dimensional structure of bound material extending through and between the layers, the method comprising repetitively:

depositing a first granular construction material as a layer into a build region;

selectively binding regions of the first granular construction material together to form first bound regions within the layer;

removing unbound granular construction material from the layer so as to provide at least one void in the layer;

depositing a second granular construction material into the build region so as to fill the at least one void;

selectively binding regions of the second granular construction material together to form second bound regions within the layer; and selectively binding further regions of unbound first granular construction material or unbound second granular construction material to form third bound regions within the layer, the third bound regions having a weaker binding than the first bound regions and the second bound regions, wherein the second granular construction material is different from the first granular construction material.

* * * * *